(12) United States Patent
Tsuboi et al.

(10) Patent No.: US 7,766,552 B2
(45) Date of Patent: Aug. 3, 2010

(54) BEARING LUBRICATING DEVICE

(75) Inventors: Takaaki Tsuboi, Kamakura (JP); Eiji Ida, Kamakura (JP)

(73) Assignee: Nippon Thompson Co., Ltd., Minato-Ku, Tokyo (JP)

( * ) Notice: Subject to any disclaimer, the term of this patent is extended or adjusted under 35 U.S.C. 154(b) by 606 days.

(21) Appl. No.: 11/740,326

(22) Filed: Apr. 26, 2007

(65) Prior Publication Data
US 2007/0251764 A1 Nov. 1, 2007

(30) Foreign Application Priority Data
Apr. 26, 2006 (JP) .............................. 2006-121912

(51) Int. Cl.
*F16C 33/66* (2006.01)
(52) U.S. Cl. ...................... 384/462; 184/100; 384/322
(58) Field of Classification Search ................. 384/462, 384/464, 469, 13, 58, 548, 549, 322, 377–399; 184/5, 5.1, 100, 3.1, 3.2
See application file for complete search history.

(56) References Cited
U.S. PATENT DOCUMENTS
282,837 A * 8/1883 Brinkerhoff ................ 384/377
567,783 A * 9/1896 Gabrio ........................ 384/379

FOREIGN PATENT DOCUMENTS
JP 53023417 A * 3/1978
JP 2004270876 A * 9/2004

* cited by examiner

*Primary Examiner*—Thomas R Hannon
(74) *Attorney, Agent, or Firm*—Cozen O'Connor

(57) ABSTRACT

A bearing lubricating device, reducing the manufacturing cost and facilitating the dimensional control and the assembly process, comprises a casing provided around an outer ring rotating relatively to a support shaft; and a lubricating member provided in the casing, which is, after the casing has been fitted over the outer periphery of the outer ring, in contact with the outer ring to apply a lubricant contained in the lubricating member to the outer periphery of the outer ring. When the casing is fitted around the outer ring, the lubricating member is in contact with the outer ring in a position either on a line, that extends in parallel to a tangent passing through a contact point between the outer ring and a supported item borne on the outer ring and passes through the center of the outer ring, or on the opposite side of the line to the contact point.

1 Claim, 8 Drawing Sheets

BEARING LUBRICATING DEVICE

FIELD OF THE INVENTION

This invention relates to a bearing lubricating device for lubricating an outer ring of a bearing.

BACKGROUND OF THE INVENTION

One of the conventional lubricating devices for lubricating an outer ring of the bearing is disclosed in Japanese Unexamined Patent Publication 2004-270876, for example. The conventional lubricating device will be described with reference to FIG. 6.

This conventional lubricating device is fixed to a bearing B. The bearing B comprises a support shaft 1, an inner ring 2 having a diameter greater than that of the support shaft 1 and receiving the support shaft 1 inserted therein, and an outer ring 3 provided around the inner ring 2. A plurality of rollers are rotatably interposed between the inner ring 2 and the outer ring 3 so as to allow for smooth relative rotation of the outer ring 3 to the support shaft 1 and inner ring 2.

The bearing B structured as described above supports the supported item on the outer ring 3 such that the supported item can rotate. For the smooth relative rotation between the outer ring 3 and the supported item, a lubricant is applied to the outer periphery of the outer ring 3 at all times.

A lubricating device 4 is disposed around the outer ring 3 for providing the lubricant. The lubricating device 4 comprises a supporting member 5 of approximately C shaped cross-section, and a lubricating member 6 secured on the inner side of the supporting member 5.

The lubricating member 6 is a resin member impregnated with a lubricant and maintains a dimensional relationship with the supporting member 5 in which the lubricating member 6 is tightly fitted into the supporting member 5. The lubricating member 6 has a recess 6a having the open upper-end. The lubricating device 4 is fixed to the support shaft 1 in such a manner as to surround the outer ring 3 of the bearing B. The outer ring 3 maintains a dimensional relationship with the lubricating device 4 in which a slight clearance 7 is kept in the recess 6a of the lubricating member 6.

In the lubricating member 6, lubricant contact ribs 8 extend out from the recess 6a to make contact at three points between the upper and bottom portions of the outer periphery of the outer ring 3 and the lubricating member 6 for the lubrication of the outer ring 3.

In FIG. 6, contact strips 9 extend upward from the top face of the lubricating member 6, and directly lubricate the supported item which is borne by the outer ring 3.

In this way, when the lubricating device 4 is provided around the outer ring of the bearing B, the outer ring 3 of the bearing B and the supported item borne by the bearing B can be lubricated with a lubricant at all times, thus realizing the smooth relative rotation of the outer ring 3 and the supported item.

Most of the lubricating member 6 of the conventional lubricating device 4 is placed so as to surround approximately the entire periphery of the outer ring 3. However, the effective time-period of the lubricating member 6 during which the lubricating member 6 is capable of lubricating the outer ring 3, that is, the life expectancy of the lubricating member 6, is significantly longer than the service life of the bearing B or the machine using the bearing B. In addition, the lubricant saturating the lubricating member 6 is not completely applied to the outer ring 3. In other words, if the lubricating member 6 is provided approximately around the entire periphery of the outer ring 3, the amount of lubricant contained in the lubricating member 6 is excessive for the outer ring 3. In this way, the manufacturing costs for the conventional lubricating device 4 increase because the lubricating member 6 contains a greater amount of lubricant than necessary.

The lubricating device 4 lubricates the outer ring 3 through the lubricant contact ribs 8. If the contact between the lubricant contact ribs 8 and the outer ring 3 is too weak, the outer ring 3 cannot be adequately lubricated.

The avoidance of this necessitates strict dimension control of the lubricating member 6 during the manufacturing process of the lubricating member 6, so that the outer ring 3 is exactly in contact with each of the lubricant contact ribs 8. Also, a complicated assembly process for fixing the lubricating device to the bearing is necessary.

SUMMARY OF THE INVENTION

It is an object of the present invention to provide a bearing lubricating device capable of reducing the manufacturing costs and facilitating dimensional control and an assembly process.

To attain this object, the present invention provides a bearing lubricating device comprising: a casing provided on the outer periphery of an outer ring of a bearing which rotates relatively to a support shaft; and a lubricating member provided in the casing, the lubricating member being in contact with the outer ring to apply a lubricant contained in the lubricating member to the outer periphery of the outer ring after the casing has been fitted over the outer periphery of the outer ring. The lubricating device is characterized in that, when the casing is fitted over the outer periphery of the outer ring, the lubricating member is in contact with the outer ring in a position either on a center line, that extends in parallel to a tangent passing through a contact point between the outer ring and a supported item borne on the outer ring and passes through the center of the outer ring, or on the opposite side of the line to the contact point.

In the bearing lubricating device, the lubricating member is preferably disposed in an area on the opposite side, to the contact point, of the center line extending through the center of the outer ring and parallel to the tangent passing through the contact point between the outer ring and the supported item borne on the outer ring, and also in a sector which is symmetrical with respect to a center line passing through the center of the outer ring and the contact point, and ranges within an angle of 60 degrees on each side from the center line.

Also, preferably, the bearing lubricating device further comprises an elastic member interposed between the casing and the lubricating member and pressing the lubricating member against the outer ring after the casing has been fitted over the outer periphery of the outer ring.

According to the present invention, when the casing is fitted around the outer ring, the lubricating member is designed to be in contact with the outer ring either on a center line, that extends in parallel to a tangent passing through a contact point between the outer ring and a supported item borne on the outer ring and passes through the center of the outer ring, or on the opposite side of the line to the contact point. In consequence, a reduction in size of the lubricating member is possible.

Even if the lubricating member is reduced in size, the lubricating member can hold sufficient lubricant to match the service life of the bearing or a machine equipped with the bearing. As a result, the size reduction of the lubricating member enables a reduction in manufacturing costs.

Further, according to the present invention, the lubricating member is designed to be disposed in an area on the opposite side, to the contact point, of the center line extending through the center of the outer ring and parallel to the tangent passing through the contact point between the outer ring and the supported item borne on the outer ring, and also in a sector which is symmetrical with respect to a center line passing through the center of the outer ring and the contact point, and ranges within an angle of 60 degrees on each side from the center line. As a consequence, a further reduction in an unnecessary amount of lubricant is possible.

In turn, the reduction in the unnecessary amount of lubricant enables a further reduction in the manufacturing costs of the lubricating device.

Still further, according to present invention, an elastic member is interposed between the casing and the lubricating member and pressing the lubricating member against the outer ring after the casing has been fitted over the outer periphery of the outer ring. In consequence, the dimensional control of the lubricating member can be somewhat eased. Also, the provision of the elastic member eliminates the need to exercise great care in adjusting the degree of contact between the outer ring and the lubricating member in the assembly process of fitting the bearing into the lubricating device, resulting in simplification of the assembly process.

DETAILED DESCRIPTION OF THE PREFERRED EMBODIMENTS

Figure 1:
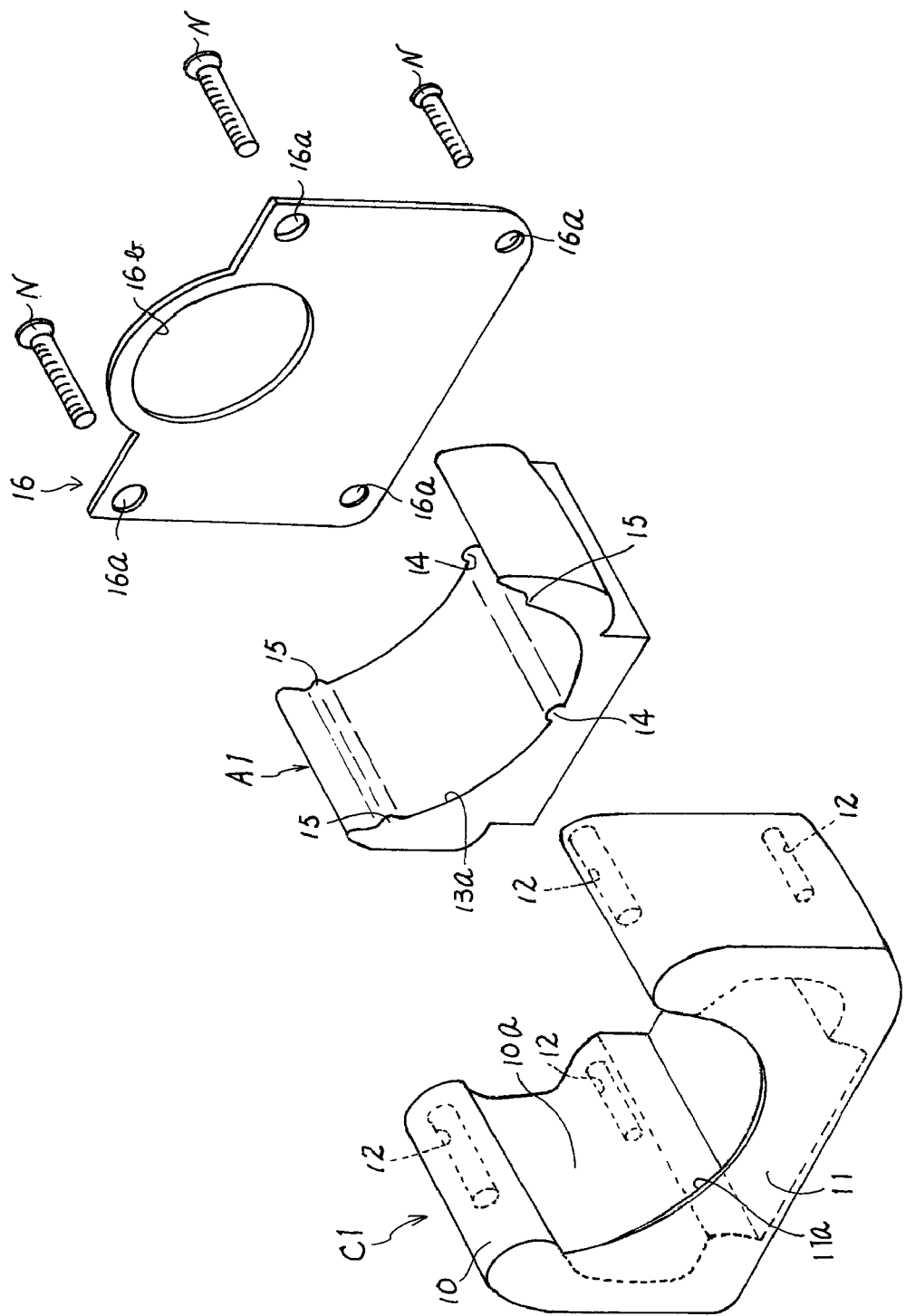
FIG. 1 is an exploded view illustrating a lubricating device according to a first embodiment of the present invention.

Exemplary embodiments according to the present invention will be described below with reference to the accompanying drawings.

A bearing equipped with a lubricating device in each of the embodiments is the same as that equipped with the conventional lubricating device described in the Background of the Invention. Accordingly, in the embodiments described below, the same components as those described in association with the conventional lubricating device are designated with the same reference numerals and a description is omitted.

A first embodiment is described with reference to FIG. 1 to FIG. 3. The lubricating device in the first embodiment comprises a casing C1 and a resin-made lubricating member A1 which is fitted into the casing C1. In FIG. 1, the casing C1, which is formed in approximately C-shape cross-section having an open upper end, has a main body 10 in which an approximately semi-circular recess 10a with an open upper end is formed. The casing C1 has a side portion 11 in which a recess 11a with a smaller depth than that of the recess 10a is formed. That is, the recess 10a of the main body 10 is deeper than the recess 11a of the side portion 11. Screw holes 12 are formed in the four corners of the casing C1, extending from the side face opposite to the side portion 11 to an approximate mid-point of the main body 10 in the axis direction.

The resin-made lubricating member A1 impregnated with a lubricant is formed by heating and caking a mixture of the powder of a thermoplastic resin material such as polyethylene or polypropylene and a lubricant made of oil or grease. The lubricating member A1 is approximately C-shaped in cross-section similar to the casing C1. As illustrated in FIG. 1, an approximately semi-circular recess 13a having an open upper end is formed in the lubricating member A1. The thickness of the lubricating member A1 in the axis direction is less than that of the casing C1.

The lubricating member A1 has a lubricating projection 14 extending inward from the bottom thereof in the direction of the recess 13, and lubricating projections 15 extending inward from the two wings of its approximate C shape in the direction of the recess 13.

When the lubricating member A1 thus structured is fitted into the casing C1, the lubricating member A1 is pressed into the casing C1 in the axis direction until one side face of the lubricating member A1 comes into contact with the side portion 11 of the casing C1. After the process of fitting the lubricating member A1 into the casing C1, a plate member 16 is placed on the side of the casing C1 such that screw holes 16a formed in the plate member 16 are aligned with the screw holes 12 formed in the casing C1, and then is fixed to the casing C1 with screws N. The plate member 16 has a support-shaft hole 16b formed for the support shaft.

Figure 2:
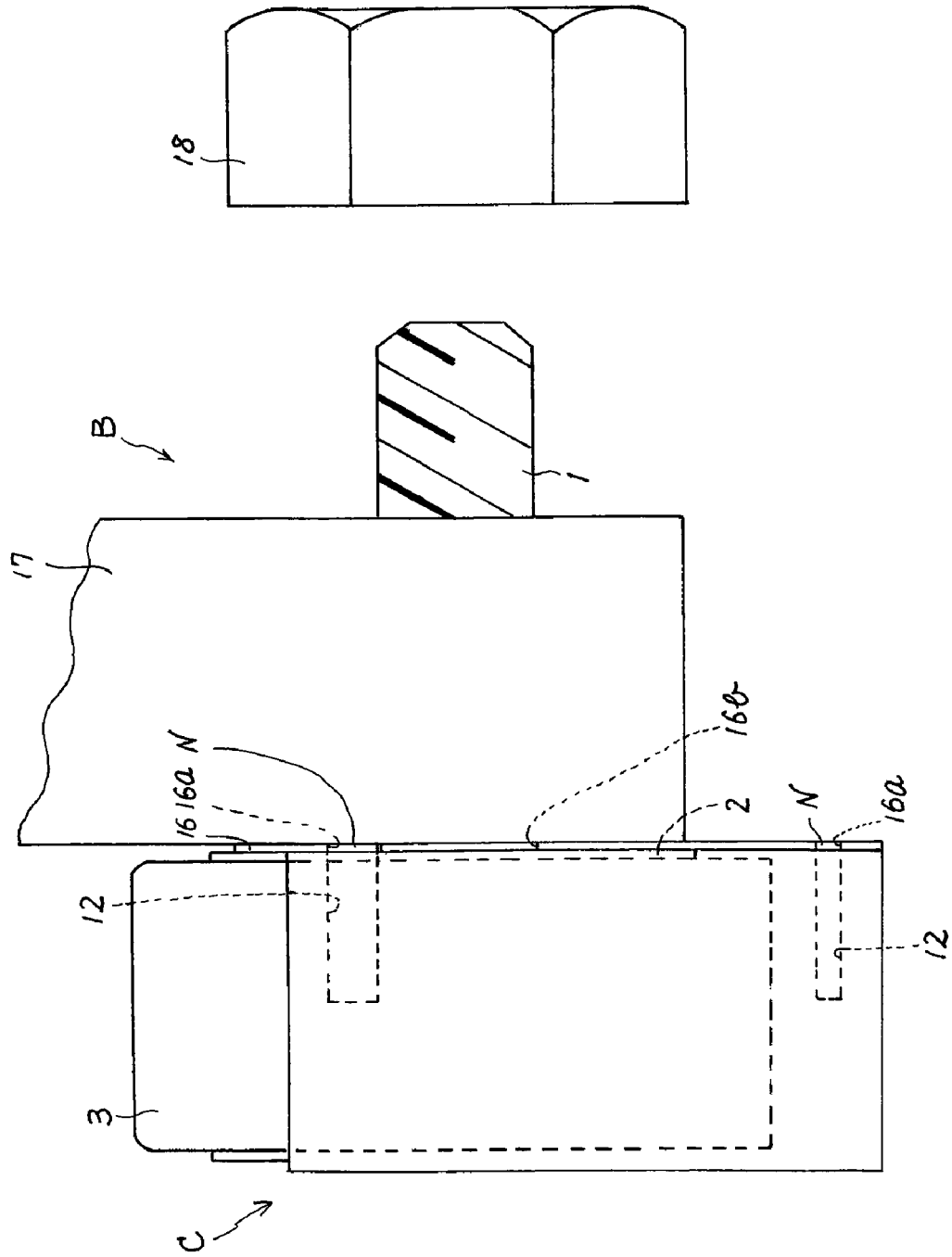
FIG. 2 is a side view illustrating the lubricating device fixed to a bearing in the first embodiment.

FIG. 2 illustrates the above-described lubricating device secured to the bearing B. As shown in FIG. 2, for the fixing of the lubricating device to the bearing B, the support shaft 1 is inserted through the support-shaft hole 16A of the plate member 16. Then, the plate member 16 is placed between the side face of the inner ring 2 of the bearing B and a fixing member 17 through with the support shaft 1 is inserted. Then, a nut 18 is fitted on the support shaft 1 from the back of the fixing member 17 and screwed against the fixing member 17. As a result, the plate member 16 is clamped between the inner ring 2 and the fixing member 17, so that the lubricating device is fixed to the bearing B.

Figure 3:
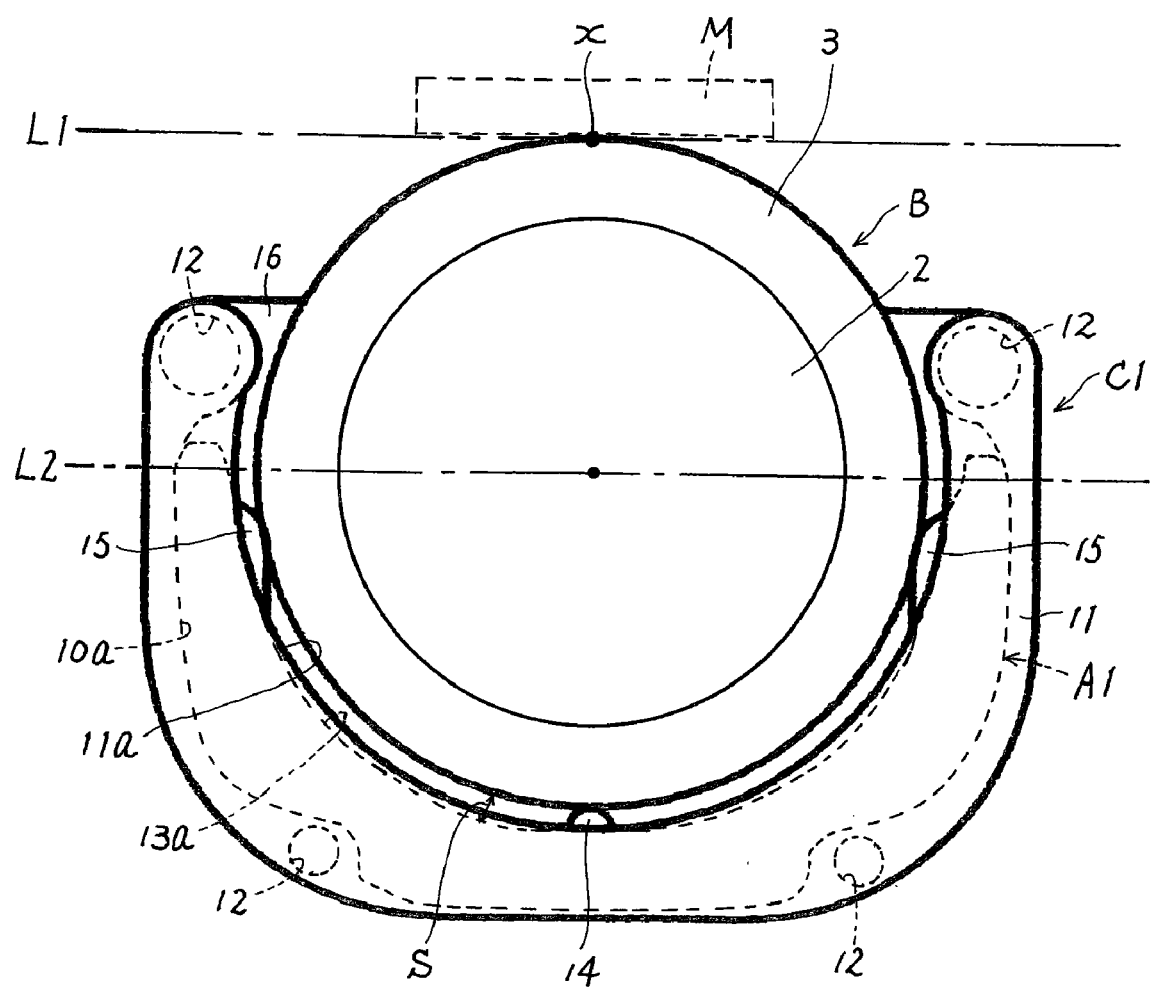
FIG. 3 is a front view illustrating the lubricating device fixed to the bearing in the first embodiment.

FIG. 3 illustrates the lubricating device fixed to the bearing B when viewed from the front thereof. As seen from FIG. 3, in the lubricating device fixed to the bearing B, the casing C1 is located so as to surround the outer ring 3, but the outer ring 3 maintains a dimensional relationship with the casing C1 in which a part of the outer ring 3 protrudes from the open end of the recess 10a of the casing C1.

The lubricating projections 14 and 15 formed on the lubricating member A1 are in contact with the outer ring 3. A clearance S is created between the outer ring 3 and the recess 13a of the lubricating member A1. The positions for forming the lubricating projections 14 and 15 will be described below in detail.

In FIG. 3, L1 denotes a tangent extending through a contact point X between the outer ring 3 and the supported item M borne on the outer ring 3 after the lubricating device has been fixed to the bearing B, in other words, after the casing C1 has been fitted over the periphery of the outer ring 3.

Assuming that the center line extending the center of the outer ring 3 and parallel to the tangent L1 is L2, the lubricating projections 14 and 15 are positioned on the opposite side of the center line L2 to the contact point X, in other words, below the center line L2 in FIG. 3, and are in contact with the outer ring 3.

The positions, and the like, of the lubricating projections 15 are not specially limited as long as the portions 15 are formed either below or on the center line L2 in FIG. 3. However, the lubricating projection 14 is desirably formed right below the center of the outer ring 3 and the pair of lubricating projections 15 are desirably formed symmetrically with respect to the lubricating projection 14.

In the lubricating device according to the first embodiment, because the lubricating member A1 and the outer ring 3 are in contact with each other below the center line L2, the need for the lubricating member A1 to extend above the center line L2 is eliminated, thus reducing the size of the lubricating member A1.

Even if the lubricating member A1 is reduced in size, the lubricating member A1 can hold sufficient lubricant to match the service life of the bearing B. As a result, the size reduction of the lubricating member A1 enables a reduction in manufacturing costs without affecting the lubrication of the outer ring 3.

In addition, because a clearance S is created between the outer ring 3 and the lubricating member A1, dust and the like involved with the rotation of the outer ring 3 can be collected in the clearance S.

Figure 4A:
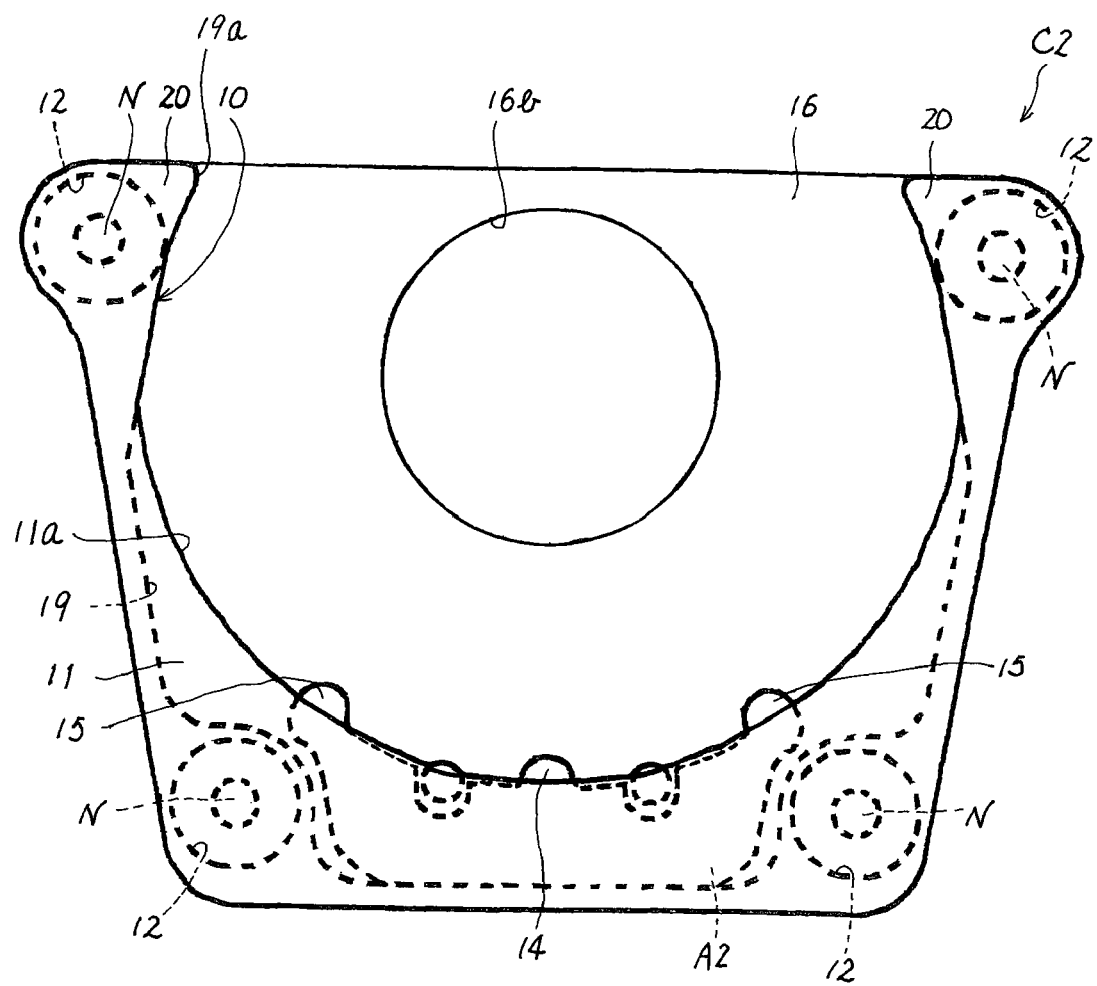
FIG. 4A is a front view illustrating a lubricating device according to a second embodiment.
Figure 4B:
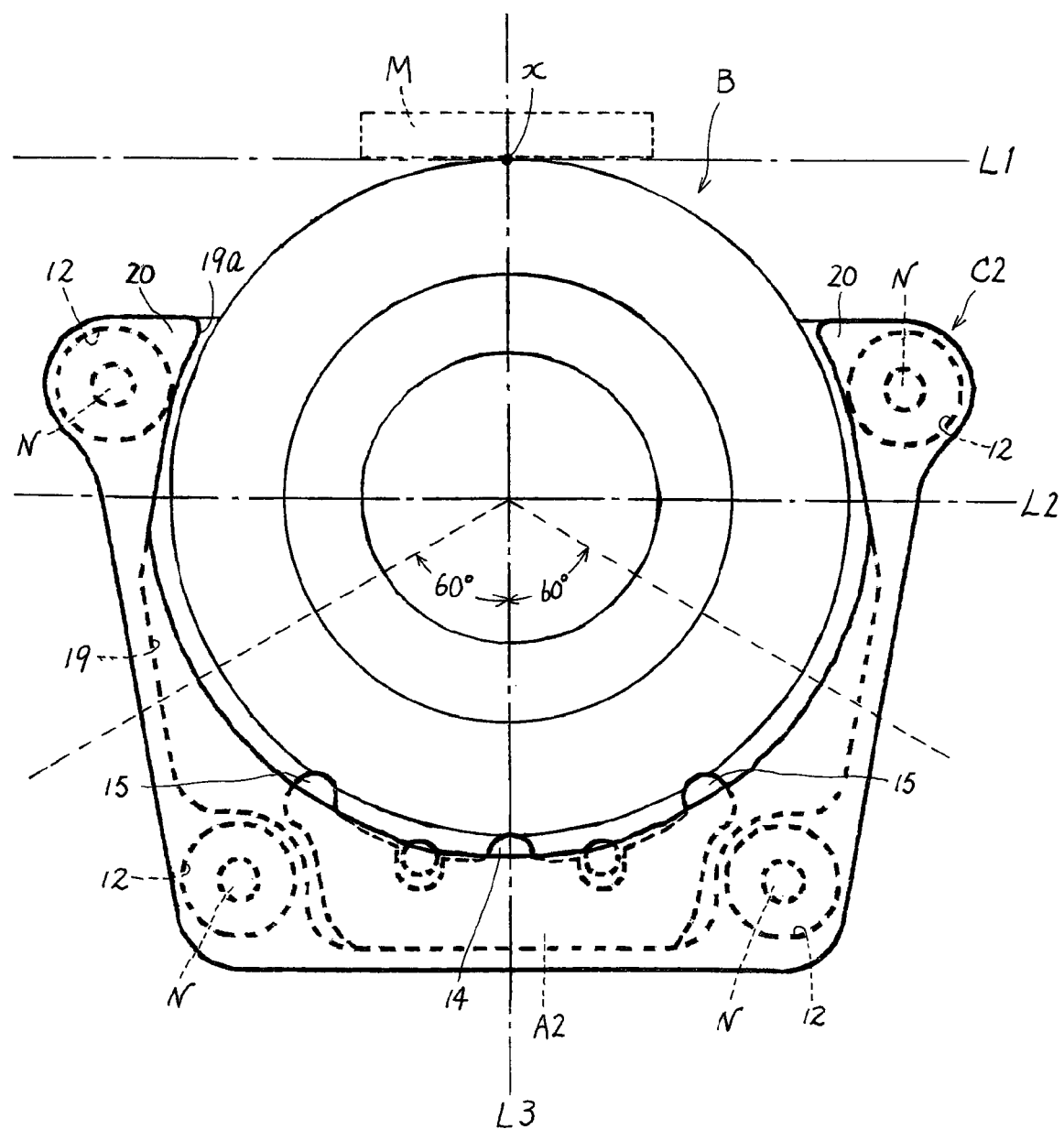
FIG. 4B is a front view illustrating the lubricating device fixed to the bearing in the second embodiment.

Next, FIGS. 4A and 4B illustrate a second embodiment of the present invention, which will be described below.

The lubricating device according to the second embodiment differs from the lubricating device of the first embodiment in the shape of the lubricating member and the shape of the casing, but is identical in the structure and the operation of the main body 10, side portion 11, recess 11a, screw holes 12, lubricant protrusion portions 14, 15, plate member 16, screw holes 16a support-shaft hole 16b, fixing member 17 and the nut 18. Therefore, the same structural components in the second embodiment as those in the first embodiment are designated with the same reference numerals. The second embodiment will be described with emphasis on the differences from the first embodiment. Note that the side view of FIG. 2 described in the first embodiment holds good for the second embodiment.

The lubricating device comprises, as illustrated in FIG. 4A, a casing C2, a lubricating member A2 fitted into the casing C2, and a plate member 16 secured onto one side face of the casing C2, in which a recess 19 having an open upper-end is formed in the casing C2 and the lubricating member A2, described below in detail, is fitted into the recess 19.

As in the case of the first embodiment, the casing C2 includes a main body 10 and a side portion 11. The recess 19 is formed in the main body 10, and has a depth greater than that of the recess 11a that is formed in the side portion 11. The screw holes 12 are formed in the four corners of the casing C2.

As illustrated in FIG. 4B, the casing C2 is positioned around the outer ring 3 when the lubricating device is fixed to the bearing B. A part of the outer ring 3 protrudes from the open end 19a of the casing C2.

A pair of scrapers 20 are formed on the top end of the casing C2 in FIG. 4B, and respectively extend out from the top end in the directions in which the two wings of the approximately C shape of the casing C2 face each other. The inner side of each of the scrapers 20 has a curvature equal to that of the outer ring 3. The curvatures 20 prevent dust and the like from entering the recess 19.

The lubricating member A2 fitted into the casing C2 as described above maintains the following dimensional relationship.

Assuming that, as shown in FIG. 4B, a tangent L1 extends through the contact point x between the outer ring 3 and the supported item M borne on the outer ring 3 after the lubricating device has been fixed to the bearing B, in other words, after the casing C2 has been fitted over the periphery of the outer ring 3; a center line L2 extends through the center of the outer ring 3 and parallel to the tangent L1; and another center line L3 extends through the contact point X and the center of the outer ring 3.

The lubricating member A2 is shaped to fit within an area which is on the opposite side of the center line L2 to the contact point X, in other words, below the center line L2 in FIG. 4B, and also to correspond to a sector defined by two lines each forming a 60° angle with the center line L3.

The following is the reason why the lubricating member A2 is shaped so as to fit within the 120-degree sector with respect to the center line L3 as described above.

The greater the size of the lubricating member A2, the more lubricant is contained in the lubricating member A2. However, conventionally, it is known from the results of experiments that, under typical use conditions, when a lubricating member has a size exceeding the 120-degree sector with respect to the center line L3, the amount of lubricant contained is excessive. In other words, at the time of the expiration of the service life of the bearing B or the machine equipped with the bearing B, the lubricating device has accomplished its role, but lubricant still remains and is available for further use.

However, this conventional lubricating device cannot be used in another bearing B having a different size, and therefore is hardly ever re-used even when lubricant remains in the lubricating member A2. This means that the lubricating device is impregnated with an unnecessary amount of lubricant, leading to an increase in cost to no purpose.

To solve this, the lubricating member A2 according to the present invention is shaped so as to fit within the 120-degree sector with respect to the center line L3 of the bearing B, and is impregnated with the minimum amount of lubricant required for lubricating the bearing B throughout its service period. Also, the lubricating projections 14 and 15 are provided within the 120-degrees sector to lubricate the bearing B.

According to the second embodiment, an overrun of the lubricant is minimized, thus reducing the manufacturing cost of the lubricating device. In addition, the lubricating device provided by the present invention is environmentally friendly on a global scale.

Next, a third embodiment of the present invention will be described with reference to FIG. 5A and FIG. 5B.

The lubricating device according to the third embodiment differs from the lubricating device of the second embodiment in that an elastic member, as described below, is provided, but is identical in the structure and the operation of the other components. Therefore, the same structural components in the third embodiment as those in the second embodiment are designated with the same reference numerals. The third embodiment will be described with emphasis on the differences from the second embodiment.

Figure 5A:
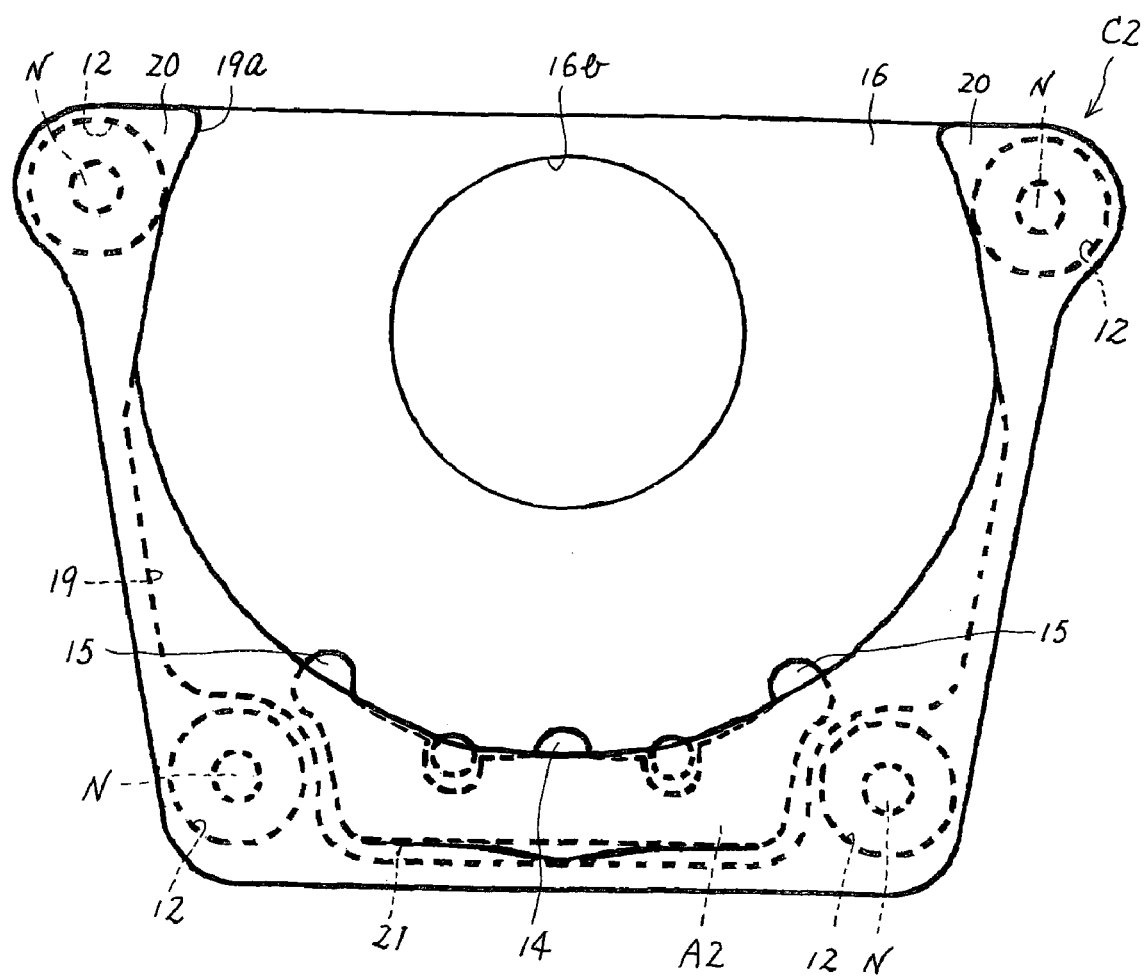
FIG. 5A is a front view illustrating a lubricating device according to a third embodiment.
Figure 5B:
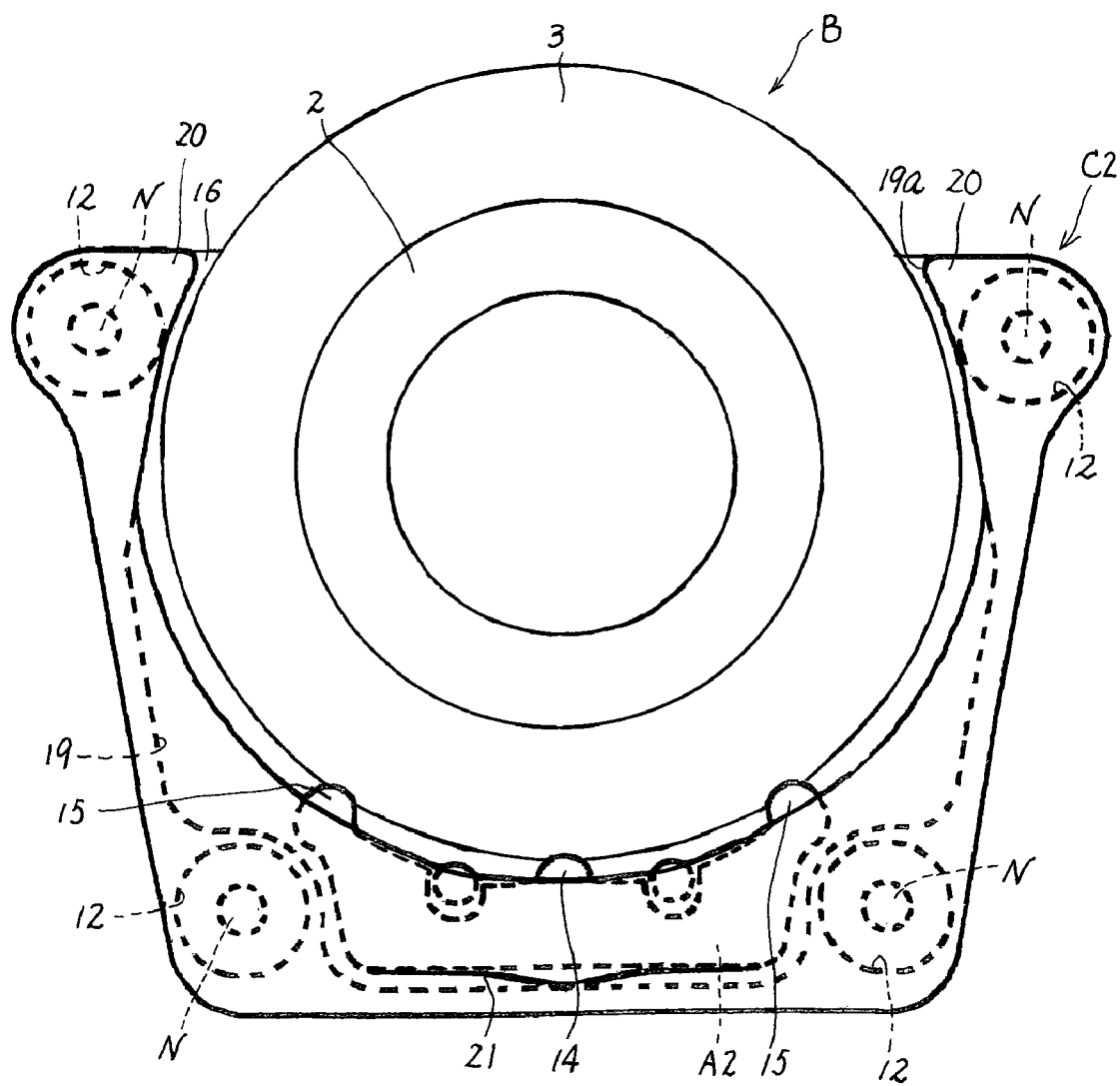
FIG. 5B is a front view illustrating the lubricating device fixed to the bearing in the third embodiment.
Figure 6:
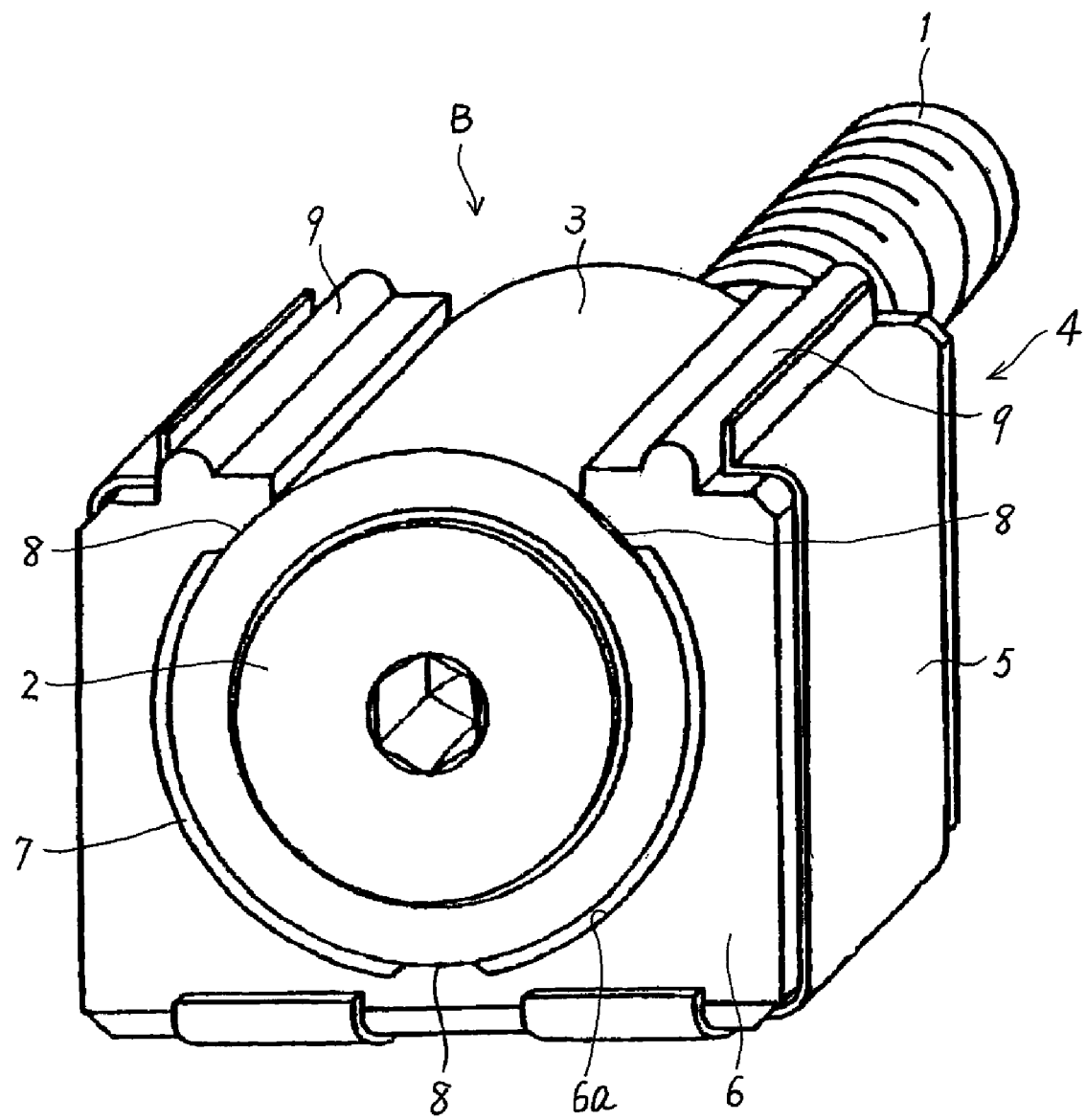
FIG. 6 is a diagram illustrating a conventional lubricating device fixed to the bearing.

As shown in FIGS. 5A and 5B, in the lubricating device, when the lubricating member A2 is fitted into the recess 19 of the casing C2, an elastic member 21 in the form of a leaf spring is interposed between the bottom of the casing C2 and the lubricating member A2.

Accordingly, once the lubricating device is fixed to the bearing B, the lubricating member A2 is pressed against the outer ring 3 of the bearing B by the elastic force of the elastic member 21. In this way, since the elastic force of the elastic member 21 presses the lubricating member A2 against the outer ring 3, the dimensional control of the lubricating member A2 can be somewhat eased. Also, the provision of the elastic member 21 eliminates the need to exercise great care in adjusting the degree of contact between the outer ring 3 and the lubricating member A2 in the assembly process of fitting the bearing into the lubricating device, resulting in simplification of the assembly process.

In the third embodiment, the lubricating member A2 is fitted in the casing C2 and the elastic member 21 is interposed between the casing C2 and the lubricating A2, but equally the lubricating member A1 according to the first embodiment may be fitted into the casing and the elastic member 21 may be interposed between the casing and the lubricating A1. In this case, the elastic member must be provided at the bottom and on the two wings of the casing.

The elastic member used is not limited particularly to a leaf spring as long as it has a thickness enabling it to be interposed between the lubricating member and the casing and can apply the elastic force required for pressing the lubricating member against the outer ring.

The preceding specific embodiments are illustrative of the practice of the invention. It is to be understood, however, that other expedients known to those skilled in the art or disclosed herein, may be employed without departing from the spirit of the invention or the scope of the appended claims.

The invention claimed is:

1. A bearing lubricating device comprising:
   a casing (C1, C2) provided on the outer periphery of an outer ring (3) of a bearing (B) which rotates relatively to a support shaft (1); and
   a lubricating member (A1, A2) made of resin provided in the casing (C1, C2), the lubricating member being in contact with the outer ring (3) to apply a lubricant contained in the lubricating member (A1, A2) to the outer periphery of the outer ring (3) after the casing (C1, C2) has been fitted over the outer periphery of the outer ring (3), characterized in that, when the casing (C1, C2) is fitted around the outer ring (3), the lubricating member (A1, A2) is in contact with the outer ring (3) in a position either on a center line (L2), that extends in parallel to a tangent (L1) passing through a contact point (X) between the outer ring (3) and a supported item (M) borne on the outer ring (3) and passes through the center of the outer ring (3), or on the opposite side of the line (L2) to the contact point (X),
   wherein the lubricating member (A1, A2) is disposed in an area on the opposite side, to the contact point (X), of the center line (L2) extending through the center of the outer ring (3) and parallel to the tangent (L1) passing through the contact point (X) between the outer ring (3) and the supported item (M) borne on the outer ring (3), and also in a sector which is symmetrical with respect to a center line (L3) passing through the center of the outer ring (3) and the contact point (X), and ranges within an angle of 60 degrees on each side from the center line (L3), and
   an elastic member (21) interposed between the casing (C1, C2) and the lubricating member (A1, A2) and pressing the lubricating member (A1, A2) against the outer ring (3) after the casing (C1, C2) has been fitted over the outer periphery of the outer ring (3).

* * * * *